(12) United States Patent
Beckmann

(10) Patent No.: US 7,827,974 B2
(45) Date of Patent: Nov. 9, 2010

(54) METHOD FOR OPERATING AN INTERNAL COMBUSTION ENGINE OF A VEHICLE, ESPECIALLY A MOTOR VEHICLE, AND DEVICE FOR IMPLEMENTING SAID METHOD

(75) Inventor: Markus Beckmann, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 10/559,479

(22) PCT Filed: May 25, 2004

(86) PCT No.: PCT/EP2004/005597

§ 371 (c)(1),
(2), (4) Date: Dec. 5, 2005

(87) PCT Pub. No.: WO2004/109090

PCT Pub. Date: Dec. 16, 2004

(65) Prior Publication Data

US 2006/0130819 A1  Jun. 22, 2006

(30) Foreign Application Priority Data

Jun. 5, 2003 (DE) ................. 103 25 413

(51) Int. Cl.
*F02M 33/00* (2006.01)

(52) U.S. Cl. .................. 123/585; 55/385.3; 96/10; 95/47

(58) Field of Classification Search .............. 123/585; 95/4, 11, 47; 55/385.3; 96/8, 10
See application file for complete search history.

(56) References Cited

U.S. PATENT DOCUMENTS 5,147,417 A * 9/1992 Nemser ................ 95/54

(Continued)

FOREIGN PATENT DOCUMENTS

| DE | 44 94 681 | 5/1995 |
|---|---|---|
| DE | 100 50 897 A1 * | 6/2001 |
| GB | 2344390 | 4/2000 |

OTHER PUBLICATIONS

"Nitrogen." Wikipedia, The Free Encyclopedia. Nov. 6, 2006, 19:31 UTC. Wikimedia Foundation, Inc. Nov. 6, 2006 <http://en.wikipedia.org/w/index.php?title=Nitrogen&oldid=86104866>.*
"Oxygen." Wikipedia, The Free Encyclopedia. Nov. 4, 2006, 17:50 UTC. Wikimedia Foundation, Inc. Nov. 6, 2006 <http://en.wikipedia.org/w/index.php?title=Oxygen&oldid=85690636>.*
Van, Jon. "Argonne out to make slow, dirty diesel a clean, mean machine." Chicago Tribune. Jul. 2, 1990. ProQuest. Jun. 8, 2007.*
Cataldi et al. "Tomorrow's motive power." Railway Age Nov. 1995. pp. 31-36.*

(Continued)

*Primary Examiner*—Michael Cuff
*Assistant Examiner*—Hung Q Nguyen
(74) *Attorney, Agent, or Firm*—Novak Druce + Quigg LLP

(57) ABSTRACT

The invention relates to a method for operating an internal combustion engine of a vehicle, particularly a motor vehicle, wherein the nitrogen content in an intake air flow (1) suctioned from the ambient air is reduced before delivering the air flow to at least one combustion chamber of the internal combustion engine (7) in order to produce a nitrogen-reduced combustion air flow whose oxygen content is higher than that of the suctioned air flow. According to the invention, the suctioned air flow (1) is run past or along at least one porous solids body (5) in at least one partial area of the intake air flow path (3), the size of the pores of said solids body being designed in such a way that the quantity of nitrogen molecules drawn off from the intake air flow (1) through the porous solids wall (5) is larger than the quantity of oxygen molecules drawn off from the oxygen or nitrogen molecules of the intake air flowing past the porous solids body (5) in order to form the nitrogen-reducing and oxygen-enriched combustion air flow that is supplied to the at least one combustion chamber (7) as main partial gas flow (8) and at least one nitrogen-enriched and oxygen-reduced secondary partial gas flow (9) which is not delivered to the at least one combustion chamber (7).

20 Claims, 1 Drawing Sheet

U.S. PATENT DOCUMENTS

Figure 1:
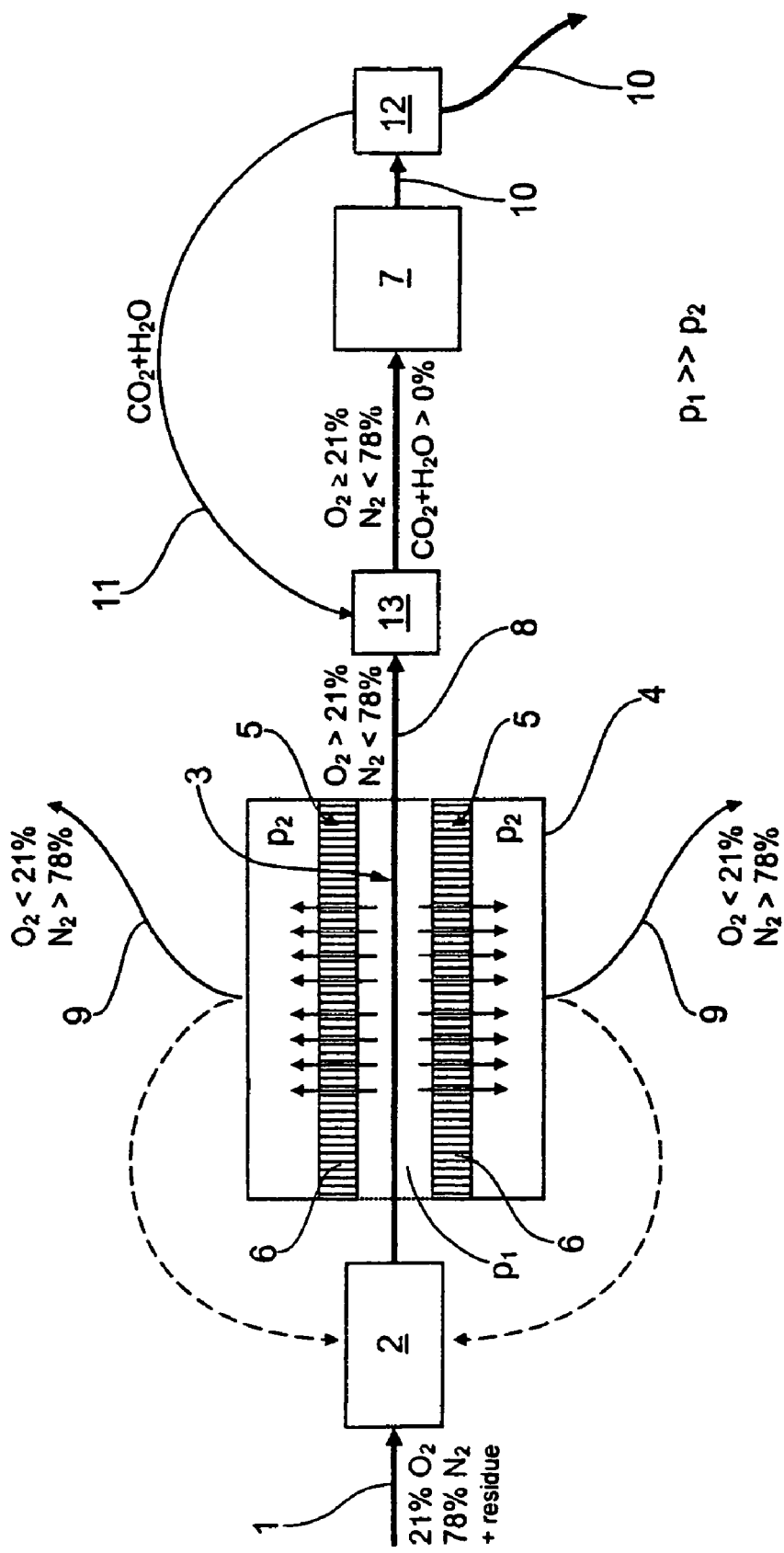

| | | | | |
|---|---|---|---|---|
| 5,526,641 | A * | 6/1996 | Sekar et al. | 60/274 |
| 5,636,619 | A * | 6/1997 | Poola et al. | 123/585 |
| 5,640,845 | A * | 6/1997 | Ng et al. | 60/274 |
| 5,649,517 | A * | 7/1997 | Poola et al. | 123/585 |
| 5,960,777 | A * | 10/1999 | Nemser et al. | 123/585 |
| 6,029,451 | A * | 2/2000 | Gartner | 60/605.2 |
| 6,055,808 | A * | 5/2000 | Poola et al. | 60/274 |
| 6,067,973 | A * | 5/2000 | Chanda et al. | 123/585 |
| 6,132,693 | A * | 10/2000 | Gruenwald et al. | 423/235 |
| 6,289,884 | B1 * | 9/2001 | Blandino et al. | 123/585 |
| 6,338,245 | B1 * | 1/2002 | Shimoda et al. | 60/285 |
| 6,352,068 | B1 * | 3/2002 | Jacobsen | 123/585 |
| 6,368,383 | B1 * | 4/2002 | Virkar et al. | 95/54 |
| 6,453,893 | B1 * | 9/2002 | Coleman et al. | 123/585 |
| 6,516,787 | B1 * | 2/2003 | Dutart et al. | 123/539 |
| 6,523,529 | B1 * | 2/2003 | Moncelle | 123/539 |
| 6,572,678 | B1 * | 6/2003 | Wijmans et al. | 95/47 |
| 6,722,352 | B2 * | 4/2004 | Smolarek et al. | 123/585 |
| 6,742,507 | B2 * | 6/2004 | Keefer et al. | 123/585 |
| 6,761,155 | B2 * | 7/2004 | Livingston et al. | 123/585 |
| 7,100,543 | B2 * | 9/2006 | Davidson | 123/26 |
| 2003/0126988 | A1 * | 7/2003 | Nelson et al. | 95/53 |
| 2004/0112211 | A1 * | 6/2004 | Meirav | 95/8 |
| 2006/0042466 | A1 * | 3/2006 | Gaertner et al. | 96/4 |

OTHER PUBLICATIONS

"New-and-improved air cleans up." R&D. Nov. 1990. Gale Group Magazine. 2007.*

"Anniversary Meeting, Mar. 30, 1870." Chemical Society—The President's Address. Jun. 1870. Digitized by Google. May 30, 2006. pp. 326-329. <http://books.google.com/books?id=1AUAAAAAMAAJ&dq=graham+diffusion+ oxygen+nitrogen+experiment>.*

"Automic radius." WebElements. May 23, 2007. <http://www.webelements.com/webelements/properties/text/definitions/atomic-radius.html>.*

"Nitrogen membrane." Innovative Gas Systems. Jan. 10, 2003. Internet Archive. Nov. 12, 2007. <http://web.archive.org/web/20030110013032/http://www.igs-global.com/generon/technology.htm>.*

"The heart of GENERON?" Innovative Gas Systems. Dec. 31, 2003. Internet Archive. Nov. 12, 2007. <http://web.archive.org/web/20031231194749/http://www.igs-global.com/generon/technology.htm>.*

* cited by examiner

METHOD FOR OPERATING AN INTERNAL COMBUSTION ENGINE OF A VEHICLE, ESPECIALLY A MOTOR VEHICLE, AND DEVICE FOR IMPLEMENTING SAID METHOD

This application is a §371 application of PCT/EP2004/005597, which claims priority from DE 10325413.7, filed Jun. 5, 2003.

The invention relates to a method for operating an internal combustion engine of a vehicle, especially a motor vehicle, as specified in the preamble of claim 1, and to a device for implementing said method as specified in the preamble of claim 11.

Pretreatment of ambient air introduced into a combustion chamber of an internal combustion engine as combustion air, which usually is made up of 21% oxygen, 78% nitrogen and 1% residual gas, for reduction of the pollutant components of the internal combustion engine is generally known. For example, DE 197 10 840 A1 has disclosed provision of an enrichment channel communicating with an intake channel, a membrane permeable by oxygen molecules being mounted in the enrichment channel. As a result of the partial vacuum predominating in the intake channel, ambient air is drawn through the membrane and is subsequently enriched with oxygen on the outlet side. In the area of opening of the enrichment channel into the intake channel the ambient air normally drawn in is admixed with the oxygen-enriched air coming from the enrichment channel before this air is introduced into the combustion chamber as combustion air.

DE 195 43 884 A1 discloses a process in which an oxygen-enriched volume flow is obtained as permeate in a complex process in a noncryogenic separation unit from an air volume flow and is introduced into the internal combustion engine. The oxygen-enriched volume flow from the noncryogenic separation unit is compressed and temporarily stored in a buffer tank from which it is taken as needed.

DE 197 10 842 A1 discloses a process for reduction of pollutants and combustion exhaust gases of internal combustion engines, a process in which combustion air of increased oxygen content is introduced into the internal combustion engine, the combustion air being obtained from ambient air by a membrane mounted in a chamber and being permeable only by oxygen molecules. In order to reduce the light-off time of the catalytic converter so as to permit reduction of the toxic emission downstream from the catalytic converter, the application proposes that the gas with an increased oxygen component be admixed with the intake air as a function of the operating point of the internal combustion engine.

DE 199 12 137 A1 discloses an internal combustion engine with oxygen enrichment such that the internal combustion engine has a gas accumulator for storage of oxygen-enriched gas which has been produced, means being provided for delivery of oxygen-enriched gas to the internal combustion engine during a cold-start phase until a specified warm-air operating state of the internal combustion engine has been reached. When the internal combustion engine is in warmed-up operation, temporarily oxygen-enriched gas is produced from air by means of an oxygen separation unit and stored at least for a brief period in the gas accumulator.

A process and structure similar to that of DE 197 10 840 A1 have also been disclosed in DE 44 04 681 C1, in which at least one channel conducting the oxygen-nitrogen air mixture is associated with an exhaust gas channel connected to the combustion chamber, is provided with a partition permeable by oxygen or stores oxygen, and oxygen is delivered exclusively by way of it to the combustion exhaust gas of a combustion chamber.

DE 42 01 423 A1 discloses a process in which a complex gas permeation system is mounted upstream from a diesel internal combustion engine so that the combustion air conducted to the diesel internal combustion engine is first filtered in its entirety through a membrane for generation of an oxygen-enriched combustion air flow.

Another generic process for operation of an internal combustion engine of a motor vehicle is disclosed in WO 01/18369 A1. Specifically, a nitrogen absorber is provided in this instance as gas separation unit, but it is very costly and complex in structure. In this instance the oxygen-enriched gas is then admixed, again by way of a separate channel, with the non-oxygen-enriched combustion air drawn in from the ambient atmosphere.

All these conducts of the process and structures have in common the feature that oxygen-enriched air is admixed with the air stream drawn in from the ambient air by way of a separate delivery channel or the combustion air drawn in is filtered in its entirety through a membrane for the purpose of enrichment with oxygen prior to delivery to the combustion chamber. Such structures present the problem that, in the first instance, a high equipment-engineering and civil engineering effort is required and, in the second instance, the danger exists that membranes may at some point in time become clogged so that delivery to the combustion chamber of the air flow required is no longer guaranteed. Conversion and application for use in series is accordingly difficult in this case.

The object of the invention is to make available a process for operation of an internal combustion engine of a vehicle, a motor vehicle in particular, and a device for implementation of such a process, a process and device by means of which oxygen enrichment of combustion air introduced into a combustion chamber of the internal combustion engine may be effected by simple means dependable in operation.

According to one embodiment of the invention the intake air flow is conducted over at least one partial area of the intake flow air path past and/or along at least one porous solid-state wall, the size of the pores of which is configured so that, of the oxygen and nitrogen molecules flowing past along the porous solid-state wall, a greater number of nitrogen molecules than of oxygen molecules pass through the porous solid-state wall. This results in formation of at least one nitrogen-reduced and oxygen-enriched combustion air flow which may be introduced into the at least one combustion chamber as primary gas flow component and results in formation of at least one nitrogen-enriched and oxygen-reduced secondary gas flow which is not introduced into the at least one combustion chamber.

Of particular advantage of this conduct of the process claimed for the invention is accordingly the more or less casual possibility of branching nitrogen off an essentially unimpeded primary air flow as intake air flow, since the porous solid-state walls effecting oxygen enrichment are mounted along the path of flow of the intake air in such a way that this flowing past or sweeping past of the intake air suffices to effect oxygen enrichment and accordingly nitrogen reduction in the combustion air flow introduced into the combustion chamber. That is to say, in the solution claimed for the invention, the flow of the combustion air drawn in is essentially unimpeded, while in the prior art as disclosed measures are taken which as a whole impair the flow of air to the combustion chamber or modify it, for example, by use of membranes or filters blocking the path of flow, ones through which the combustion air drawn in must flow in its entirety and which may clog with the passage of time. In addition, no additional equipment engineering structures such as gas reservoirs or additional air circulation ducts are required by means of which oxygen-enriched gas produced in a separate unit must be admixed with a flow of intake air. Consequently, conduct of the process of the invention makes certain that everything which is drawn in may also flow in the direction of the combustion chamber.

Tests have shown that at a given temperature the nitrogen molecules move at a higher speed than do the oxygen molecules, which are heavier than the nitrogen molecules. As a result of these different speeds, when the molecules strike the porous solid-state wall, the nitrogen molecules can pass through the porous solid-state wall with greater ease and more rapidly than can the oxygen molecules. These different transport and velocity properties of the nitrogen molecules and oxygen molecules are accordingly used to advantage in an especially simple way in order to effect nitrogen reduction in the intake air in order to configure a nitrogen-reduced and oxygen-enriched combustion air flow in the intake air without the need for complex admixture of oxygen-rich gas flows or filtering of the air flow as a whole through membranes or the like affecting the flow pattern. The oxygen enrichment may be coincidental.

In addition, such conduct of the process in conjunction with operation of an internal combustion engine may result in reduction of the raw emissions of nitrogen oxide, and of carbon monoxide, hydrocarbon, and soot particles as well. Reduction of the pollutants emitted in turn results in smaller dimensions of parts of the exhaust gas system, something which in its turn results in lower production costs.

Especially advantageous results can be obtained by compressing the intake air flow by means of at least one compressor prior to its delivery to the porous solid-state wall. As an alternative or in addition, however, provision may be made such that the secondary partial gas flow is exhausted in the area of the porous solid-state wall by means of a vacuum device. This higher pressure level supports nitrogen molecule reduction of the air intake flow, a pressure difference provided as being generated in the direction of the secondary partial gas component flow side on the primary partial gas flow side and the secondary partial gas flow side.

In another especially preferred conduct of the process, the secondary partial gas flow may be directed back at least in part to the intake air flow before its is introduced into the solid-state wall area, if this is found to be necessary.

In one also especially preferred conduct of the process, a partial exhaust gas flow of an exhaust gas flow withdrawn downstream from the combustion chamber is introduced into the nitrogen-reduced and oxygen-enriched combustion air flow is introduced into the at least one combustion chamber. The volume of the exhaust gas flow may be reduced to advantage by an advantageous circulation system such as this, as a result of which, for example, the converters, such as a three-way catalytic converter, an oxy-catalytic converter, and a particle filter, may also be made smaller, so that the dimensions of the exhaust gas system as a whole may be made smaller. And, again, costs may be lowered as a result. In addition, it is possible by simple means to employ gases distinguished by an especially high heating value and in addition having no nitrogen or nitrogen oxide components to assign a desired combustion air composition, for example, in conjunction with control action. For example, provision may be made such that there is introduced into the nitrogen-reduced combustion air flow in normal operation of the internal combustion engine an amount of partial exhaust gas flow such that the oxygen component of the primary partial gas flow, that is, of the nitrogen-reduced combustion air flow, corresponds essentially to the intake air flow drawn in from the ambient atmosphere, the oxygen component in this instance being around 21%. As an alternative, however, provision may also be made such there is introduced into the nitrogen-reduced combustion air flow in startup operation of the internal combustion engine, that is, during a cold start, an amount of partial exhaust gas flow such that the oxygen component of the primary partial gas flow, that is, the nitrogen-reduced combustion air flow, is greater than the oxygen component of the intake air flow drawn in from the ambient atmosphere. By preference the oxygen component in this instance may fall within the range, for example, of 21 to 40%. The efficiency of the engine in burning of the mixture may be increased for a brief period by such oxygen enrichment without the risk that conventional internal combustion engines might not be able to withstand the higher combustion temperatures which might occur. In theory, however, appropriate dimensioning and design of the engines would be possible in such a case, so that the internal combustion engine could be operated even over a lengthy period with an increased oxygen component.

Special preference is also to be given to implementation of the process in which the amount of partial exhaust gas flow introduced into the air intake flow is controlled as a preset value by a control device as a function of an assigned oxygen component in the combustion air flow. It is this control device which is to compute and/or determine the actual oxygen component of the intake air flow directly and/or indirectly as the actual value. Such control permits especially simple and rapid compensation for any lower air density, such as in mountainous regions or at elevated exterior temperatures.

In another preferred conduct of the process provision is also made such that the partial exhaust gas flow introduced into the intake air stream is established so that in the at least one combustion chamber a combustion air flow with more or less constant gas volume is available for formation of a mixture with a fuel. This ensures that a more or less constant gas volume is drawn into the combustion chamber each time for the purpose of continuous combustion.

The advantages indicated in the foregoing in connection with the process apply to the device as well, so that they will not be discussed further at this point.

The invention will be described in detail below with reference to the drawing, in which the sole FIGURE illustrates in diagram form conduct of the process claimed for the invention, with an intake air flow 1 which is drawn in from the ambient atmosphere, is compressed in a compressor 2, and subsequently flows, at a pressure p1, which is higher than atmospheric pressure, past or along a porous solid-state wall 5 of a reduction device 4. The porous solid-state wall 5 has a pore size of the pores 6 such that, of the nitrogen and oxygen molecules of the intake air flowing along the porous solid-state wall 5, a higher number of nitrogen molecules of the air intake flow than oxygen molecules flow through the porous solid-state wall 5 from the air intake flow. There is thereby formed along the primary flow path both a nitrogen-reduced and oxygen-enhanced combustion air flow which may be introduced into the internal combustion engine 7 and a nitrogen-enriched and oxygen-reduced secondary partial gas flow 9 which is not introduced into the internal combustion engine 7. A pressure level p2 lower than the higher pressure level p1 assigned by the compressor 2 in the area of the intake air flow path 3 as primary flow direction predominates in the secondary partial gas flow 9.

As is indicated by broken lines in the FIGURE, the secondary gas flow or flows 9 optionally may also be reintroduced into compressor 2 in circulation.

The nitrogen-reduced and oxygen-enriched primary partial gas flow 8 leaving the reduction device 4 is then conducted as combustion air flow to a combustion chamber of the internal combustion engine 7. As is also illustrated in greatly simplified diagrammatic form in the FIGURE, a partial exhaust gas flow 11 withdrawn from the exhaust gas flow 10 may, in conjunction with a control device 12 shown here in diagrammatic form only, be returned to the primary partial gas flow 8 by means of partial exhaust gas return for the purpose, for example, of constantly introducing in normal operation of the internal combustion engine 7 a partial exhaust gas flow amount into the nitrogen-reduced combustion air flow as primary gas flow such that the oxygen component of the primary partial gas flow 8 corresponds approximately to that of the intake air flow 1 drawn from the ambient atmosphere, that is, in this instance amounts essentially to 21%. The admixing may in this instance be effected in an admixture device 13.

As an alternative, however, during start up operation, that is, for example, during cold starting of the internal combustion engine 7, an amount of partial exhaust gas flow may be introduced into the primary partial gas flow 8 such that the oxygen component of the primary partial gas flow 8 is greater than the oxygen component of the intake air flow drawn from the ambient atmosphere, that is, may be greater than 21%. The amount of partial exhaust gas flow 11 introduced into the primary partial gas flow 8 is controlled as preset value by means of the control device 12, which directly or indirectly calculates and/or determines the actual oxygen component in the primary partial gas flow 8 as an actual value, for example, by means of a conventional oxygen probe, which is not shown here.

The invention claimed is:

1. A method of supplying a combustion gas to an internal combustion, engine, comprising:
    guiding a stream of ambient air containing nitrogen and oxygen molecules through an open passageway defined by au encompassing body penetrable by said nitrogen and oxygen molecules and having a pore size configured to permit a more ready penetration therethrough of said nitrogen molecules than said oxygen molecules, imposing a pressure drop across said encompassing body, thereby converting said stream into an oxygen enriched stream; and
    introducing said oxygen enriched stream into at least one combustion chamber of said engine.

2. A method according to claim 1 including pressurizing said ambient air guided through said encompassing body.

3. A method according to claim 1 including providing an increased pressure drop across said encompassing body.

4. A method according to claim 1 including applying a vacuum to the nitrogen molecules emanating from said encompassing body.

5. A method according to claim 1 including recirculating a portion of said nitrogen molecules to said stream of ambient air guided through said encompassing body.

6. A method according to claim 5 including recirculating a sufficient amount of said exhaust gases to said oxygen enriched stream such that the oxygen component of said oxygen enriched stream is greater than the oxygen component of said drawn ambient air in the range of 21% to 40%.

7. A method according to claim 1 including recirculating a portion of the exhaust gases emanating from said engine to said oxygen enriched stream.

8. A method according to claim 7 including recirculating a portion of said exhaust gases to said oxygen enriched stream in such proportions so as to simulate the constituency of said ambient air, at selected modes of operation of said engine.

9. A method according to claim 7 including recirculating a portion of said exhaust gases to said oxygen enriched stream in such proportion so that the oxygen component of the stream injected into the engine is greater than the oxygen component of said drawn ambient air.

10. A method according to claim 9 including monitoring the oxygen component of said oxygen enriched stream and controlling the recirculation of a portion of said exhaust gases to said oxygen enriched stream to provide an oxygen content of a preset value.

11. A method according to claim 10 wherein said preset value is established to provide a selected fuel/air mixture.

12. A method according to claim 1 wherein said drawn stream of ambient air is conditioned to cause the nitrogen molecules thereof to flow at a velocity greater than the velocity of the oxygen molecules thereof.

13. A method according to claim 12 wherein said drawn stream of ambient air is conditioned by compression.

14. A device for supplying a combustion gas to an internal combustion engine, comprising:
    a solid body formed of a porous material penetrable by oxygen and nitrogen molecules, having a pore size configured to permit a more ready penetration therethrough of nitrogen molecules than oxygen molecules, and an open passageway therethrough encompassed by said porous body, provided with an inlet communicable with an ambient air intake an outlet communicable with a combustion cylinder of said engine,
    wherein upon guidance of a stream of ambient air containing oxygen and nitrogen molecules through said passageway encompassed by said porous body, a pressure differential is imposed between said encompassed passageway and the exterior of said porous body, thereby converting said stream of ambient air into an oxygen enriched stream.

15. A device according to claim 14 including means for pressurizing said ambient air injected through said body.

16. A device according to claim 14 including means for providing a pressure drop across said body between said passageway and the exterior thereof.

17. A device according to claim 14 including means for recirculating a selected portion of exhaust gases of said engine to said oxygen enriched stream.

18. A device according to claim 17 including means for controlling the amount of said exhaust gas recirculated to said oxygen enriched stream.

19. The device according to claim 14 including means for conditioning said ambient air drawn into said unimpeded passageway, to cause the nitrogen molecules thereof to flow at a velocity greater than the velocity of the oxygen molecules thereof.

20. The device according to claim 19 wherein said means for conditioning said drawn stream of ambient air comprises a compressor.

* * * * *

UNITED STATES PATENT AND TRADEMARK OFFICE
CERTIFICATE OF CORRECTION

| | | |
|---|---|---|
| PATENT NO. | : 7,827,974 B2 | Page 1 of 1 |
| APPLICATION NO. | : 10/559479 | |
| DATED | : November 9, 2010 | |
| INVENTOR(S) | : Markus Beckmann | |

It is certified that error appears in the above-identified patent and that said Letters Patent is hereby corrected as shown below:

Within the preamble of claim 1, Col. 5, line 36, - please omit the "," after combustion. The preamble should read, "A method of supplying a combustion gas to an internal combustion engine, comprising:"

Within claim 1, Col. 5, line 39, - please replace "au" with "an".

Within claim 14, Col. 6, line 34, - after "intake" insert --and--.

Signed and Sealed this
Fifth Day of July, 2011

David J. Kappos
*Director of the United States Patent and Trademark Office*